(12) United States Patent
Liebetrau et al.

(10) Patent No.: US 12,286,329 B2
(45) Date of Patent: Apr. 29, 2025

(54) ELEVATOR INSTALLATION AND OPERATING AND/OR DISPLAY PANEL FOR AN ELEVATOR INSTALLATION

(71) Applicant: Inventio AG, Hergiswil (CH)

(72) Inventors: Christoph Liebetrau, Menziken (CH); Alessandro D'Apice, Ebikon (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/573,481

(22) PCT Filed: Jun. 28, 2022

(86) PCT No.: PCT/EP2022/067644
§ 371 (c)(1),
(2) Date: Dec. 22, 2023

(87) PCT Pub. No.: WO2023/274996
PCT Pub. Date: Jan. 5, 2023

(65) Prior Publication Data
US 2024/0286871 A1   Aug. 29, 2024

(30) Foreign Application Priority Data

Jun. 30, 2021   (EP) ..................... 21182775

(51) Int. Cl.
| B66B 5/02 | (2006.01) |
| B66B 1/46 | (2006.01) |
| B66B 3/00 | (2006.01) |
| B66B 13/30 | (2006.01) |
| F03G 7/06 | (2006.01) |

(52) U.S. Cl.
CPC .............. *B66B 5/024* (2013.01); *B66B 1/466* (2013.01); *B66B 1/467* (2013.01); *B66B 3/002* (2013.01); *B66B 13/303* (2013.01); *F03G 7/06114* (2021.08)

(58) Field of Classification Search
CPC ....... B66B 5/024; B66B 13/303; B66B 1/466; B66B 3/002; B66B 1/467; F03G 7/06114
See application file for complete search history.

(56) References Cited

U.S. PATENT DOCUMENTS 11,512,524 B1 * 11/2022 Eison ................... B66B 13/303
2016/0244297 A1   8/2016 Yoon et al.

FOREIGN PATENT DOCUMENTS

| GB | 2595958 A | * 12/2021 | ............ E05B 41/00 |
| JP | S56174427 U | 12/1981 | |
| JP | H02282174 A | 11/1990 | |
| JP | 2013159460 A | 8/2013 | |
| KR | 101870568 B1 | 6/2018 | |

(Continued)

OTHER PUBLICATIONS

Machine Translation of JPS 56-174427.*
Machine Translation of JPH 02-282174.*

*Primary Examiner* — Diem M Tran
(74) *Attorney, Agent, or Firm* — Williams J. Clemens; Shumaker, Loop & Kendrick, LLP (57) ABSTRACT

A landing door of an elevator system includes a door leaf that is equipped with an integrated operating and/or display panel. In the event of a fire, a printed circuit board of the operating and/or display panel is removed from the door leaf by activation of an ejection device comprising intumescent material and being positioned in the door leaf.

16 Claims, 5 Drawing Sheets

(56) References Cited

FOREIGN PATENT DOCUMENTS

WO       9958803 A1    11/1999
WO    WO-2010042099 A1 *  4/2010   ............. B66B 13/30
WO     2014067895 A1    5/2014

* cited by examiner

ELEVATOR INSTALLATION AND OPERATING AND/OR DISPLAY PANEL FOR AN ELEVATOR INSTALLATION

FIELD

The invention relates to an elevator system. The elevator system for conveying persons or goods has an elevator car that can be moved in an elevator shaft between floors. At least one landing door for closing the elevator shaft is provided on at least one floor. The landing door comprises a door leaf with an integrated operating and/or display panel. The invention furthermore relates to an operating and/or display panel for such an elevator system.

BACKGROUND

Elevator systems for conveying persons and goods have been known and in common use for a long time. Call detection units for inputting a floor call are frequently arranged on the floors. After a person has made a floor call from a floor of departure, the elevator car travels to this floor. A floor display integrated in the door frame of the landing door, indicates to the person the floor on which the elevator car approaching the floor of departure is currently located.

WO 2014/067895 A1 discloses a door leaf with an integrated operating and display panel for a landing door of an elevator system.

SUMMARY

It is an object of the present invention to provide an elevator system with a door leaf with an operating and/or display panel integrated therein, which operating and/or display panel also satisfies high safety requirements in the event of a fire.

This and other objects are achieved according to the invention with an elevator system that has the features described herein. The elevator system for conveying persons or goods can comprise an elevator car that can be moved in an elevator shaft between floors. The elevator system furthermore comprises a landing door comprising a door leaf, via which landing door the elevator car is accessible from the floor. The elevator system has an elevator control unit for operating the elevator system, wherein the elevator control unit in particular controls a drive unit for moving the elevator car. An operating and/or display panel is integrated in the door leaf. Control commands to the elevator control unit can be input using the operating panel. The display panel is used to display information. For example, the operating panel can contain display elements, such as an illuminated display, for confirming the commands input. On the floor, operating units, e.g., designed as operating panels, can be provided in particular in the form of call detection units for inputting a floor call. However, operating panels could also be used to detect a destination call. The operating and/or display panel can furthermore also be designed as a floor display or contain such a floor display. The floor information indicates to the person on the floor who called the elevator car the floor at which the elevator car is currently located. Alternatively, the operating and/or display panel could also specify which, if a destination call controller is present, destination floor was selected after actuation of a destination call.

Since the door leaf is equipped with an ejection device, by means of which ejection device the operating and/or display panel can at least partially be removed from the door leaf in the event of a fire, the elevator system provided with such a door leaf also satisfies high safety requirements in the event of a fire. The term "partially" refers to the operating and/or display panel which is not to be removed completely, but of which only parts are to be removed from the door leaf by means of the ejection device in the event of a fire. Comparatively easily flammable and combustible parts of the operating and/or display panel can thus be separated safely and reliably from the door leaf. Without these parts, the door leaf can then withstand higher temperatures in the event of a fire. As a result, the fire safety of the elevator system is considerably increased. The door leaf is preferably equipped with an ejection device that can automatically be activated under the effect of heat. In this case, the ejection device is activated under thermal overload, i.e., when a particular temperature associated with a fire event is exceeded. After activation, the ejection device pushes off the part to be removed of the operating and/or display panel or, where applicable, the entire operating and/or display panel outward until it comes off; or, after activation of the ejection device, the part to be removed of the operating and/or display panel moves outward until it comes off.

Each floor of the elevator system is preferably provided with a landing door which has a door leaf with an integrated operating and/or display panel with the previously described ejection device. However, it is also conceivable that not every floor has such a fire protection door.

In a first embodiment, the ejection device comprises an actuator that expands in heat and has a memory metal or a bi-metal. However, it would also be conceivable for the actuator expanding in heat to contain an expansion material element. Alternatively, the ejection device can have an actuator that can be activated under the effect of heat and has a preloaded spring for forming a mechanical energy store. The actuator containing a spring can have an actuator housing in which the spring is arranged. The actuator housing holds the spring in a preloaded rest position. The actuator housing consists, for example, of a plastic material which melts in the event of a fire and thus releases the spring for generating a spring force, whereby the desired movement for removing the corresponding part of the operating and/or display panel results. However, the actuator housing can also be constructed of a thermally resistant material, such as a metal. In this case, the actuator housing, secured by means of a solder connection, can hold the spring in the rest position either way. When the solder connection is melted in the event of a fire, the preloaded spring is released and the spring force causes the desired movement for removing the at least a part of the operating and/or display panel from the door leaf.

In a preferred embodiment, the ejection device comprises intumescent material. Due to the ejection device that can be operated with intumescent material, the at least one part of the operating and/or display panel can be removed from the door leaf in a simple and reliable manner. Known from fire protection, intumescent material is a material that increases its volume under the effect of heat. Intumescent material forms an actuator which, due to the volume increase of the intumescent material, initiates a movement in the event of a fire so that the operating and/or display panel moves or is moved at least partially outward. An ejection device comprising intumescent material is characterized by high safety and reliability. This ejection device is practically fail-safe.

The intumescent material can be formed with an organic plastic material and further additives. In the event of a fire, the intumescent material can foam up to form a material that cannot be burned or is difficult to burn, resulting in a fire-retardant effect. The intumescent material can be produced, for example, from a polyurethane admixed with expandable graphite or vermiculite, wherein the expandable graphite multiplies its volume in the event of a fire. Alternatively, intumescent materials can be produced on the basis of epoxy resins which are provided with additives. Instead of polyurethane, silicone foam plastics and/or polyimide foam plastics can also be used to create the intumescent material.

Due to the intumescent material, an advantageous thermal insulation of the door leaf can furthermore be achieved.

For covering the shaft access, the door leaf has an outer wall which faces the floor and is preferably made of a metal sheet. The door leaf can furthermore have a rear wall likewise made of a metal sheet. A support structure made of the same metal can be provided between the outer wall and the rear wall, which are generally arranged parallel to one another and at a distance from one another.

The operating and/or display panel can comprise a printed circuit board and a carrier frame for carrying the printed circuit board, wherein the printed circuit board can be removed from the door leaf by means of the ejection device in the event of a fire, and wherein the carrier frame is preferably fixedly connected to the door leaf. In other words, in the event of a fire, the printed circuit board can be removed from the door leaf by means of the ejection device, while the carrier frame remains on the door leaf. The operating and/or display panel is consequently not completely separated, but only a portion thereof is, just the printed circuit board. The carrier frame preferably consists of metal, generally of the same material as the door leaf. The printed circuit board can contain the electronic components for operating the operating and/or display panel. The part to be removed in the event of a fire can, for example, comprise a touchscreen surface in addition to the printed circuit board. The printed circuit board and the touchscreen surface contain easily flammable or combustible parts. The removal of such parts that are risky for fire safety is advantageous. Of course, instead of a touchscreen surface, other elements, such as ductile buttons, can also be arranged on the printed circuit board.

Intumescent material, for example in the form of strips, can be arranged on the printed circuit board. This intumescent material can be a component of the aforementioned ejection device. However, this intumescent material can also form a spacer so that, at least in a first phase, the sensitive printed circuit board is still spaced apart from the internal metallic door leaf parts that are hot in the event of fire.

It can be advantageous if an ejection plate that can be moved in the direction of the printed circuit board is arranged in the door leaf. The ejection plate is a component of the ejection device. In the event of a fire, the ejection plate is moved against the printed circuit board, for example using an actuator as described above; the ejection plate comes into contact with the printed circuit board and pushes the printed circuit board off during the further movement.

The ejection plate is preferably designed in such a way that, after removing the one part of the operating and/or display panel from the door leaf, it closes the gap in the door leaf that results from the removal. Fire safety can again be significantly increased in this way.

If the operating and/or display panel has a printed circuit board and a carrier frame, the ejection plate is preferably designed and installed in the door leaf in such a way that, after removing the printed circuit board, it closes the carrier frame or the interior thereof.

Particularly preferably, guide means for guided movement of the ejection plate are provided in the door leaf, or it is particularly preferred if the operating and/or display panel has guide means for guided movement of the ejection plate. Guide means can, for example, be guide rods or other guide elements which are arranged in the door leaf and extend in the horizontal direction between an outer wall, which is associated with the operating and/or display panel, and a rear wall, which is opposite the outer wall and, in the case of the landing door, faces the elevator car. However, guide means can also be guide elements which belong to the operating and/or display panel. The ejection plate advantageously has corresponding means for guiding, for example in the form of cutouts or recesses, which are in operative connection with the aforementioned guide means.

For simple guidance of the ejection plate, guide elements created on the carrier frame by bending can, for example, be in the form of guide tongues as guide means. The guide elements, which are preferably molded onto the carrier frame and integrally connected to the carrier frame, can be arranged on both sides of the carrier frame. Guide tongues are leg segments that are created by bending and preferably adjoin the outer sides of the frame at right angles. The guide tongues together with the carrier frame define a U-shape in cross section. Particularly preferably, two guide tongues or other guide elements are molded onto or fastened to the carrier frame per side. The ejection plate can have slots into which the guide tongues are received.

For reliable functioning of the ejection device, it can be advantageous if intumescent material, preferably in the form of a plate, is attached to the ejection plate. At least one such plate or a plurality of plates can be attached to the ejection plate. The expansion effect can be adjusted via the thickness of the plate(s). As an alternative to the attachment to the ejection plate, intumescent material could however also be attached to a rear wall. The intumescent material that increases its volume in the event of a fire pushes the ejection plate toward the operating and/or display panel and finally pushes the latter off.

If intumescent materials are provided both on the ejection plate and on the rear wall, a two-stage ejection movement or ejection process results.

The door leaf can have a rear wall, wherein the rear wall can be closed in the region of the operating and/or display panel by a cover part detachably fastened to the rear wall. The rear wall or the cover part can form a fixed stop for the ejection device, at which stop the ejection plate or the intumescent material of the ejection plate can be supported in the event of a fire so that pushing off is enabled.

A further aspect of the invention furthermore relates to an operating and/or display panel for an elevator system and in particular to an operating and/or display panel for the previously described elevator system. The operating and/or display panel comprising a printed circuit board and a carrier frame for carrying the printed circuit board is characterized in that it has intumescent material for fire protection. For example, with the aid of the intumescent material, the printed circuit board can be separated from the carrier frame in the event of a fire. Instead of or, where applicable, in addition to the intumescent material, the operating and/or display panel could an actuator expanding in heat or an actuator with a preloaded spring for forming an ejection device by means of which the printed circuit board can be separated from the carrier frame in the event of a fire.

A further aspect of the invention finally relates to a fire-proof flat elevator component having an integrated operating and/or display panel. This is because, as an alternative to the aforementioned door leaf for a landing door of an elevator system, the previously described operating and/or display panel and the ejection device can also be used in other flat elevator components and can be advantageous for them. A flat elevator component is understood herein to mean plate-like or other flat structures for closing spaces or other boundaries of elevator shafts and elevator cars; i.e., not only door leaves but also, for example, for car walls, floors, ceilings and windows. A flat elevator component can in particular also be a component of a door frame of a landing door. In conventional elevators, the call detection unit is often arranged at a shaft front wall next to the landing door. Even operating and/or display panels, or parts thereof (i.e., for example, printed circuit boards), arranged on the shaft front wall can be removed from the shaft front wall by means of ejection devices in the event of a fire in the manner described above.

The flat elevator component is preferably designed in such a way that, after removing the entire or the respective part of the operating and/or display panel from the flat elevator component, the gap in the flat elevator component that results from the removal is closed by means of an ejection plate. As an alternative to the operating and/or display panel, the fire-proof flat elevator component could also have other potential fire loads, such as control devices or the like, which can be removed from the flat elevator component by means of the ejection device in the event of a fire.

DESCRIPTION OF THE DRAWINGS

Further individual features and advantages of the invention can be derived from the following description of exemplary embodiments and from the drawings. In the drawings.

DETAILED DESCRIPTION

Figure 1:
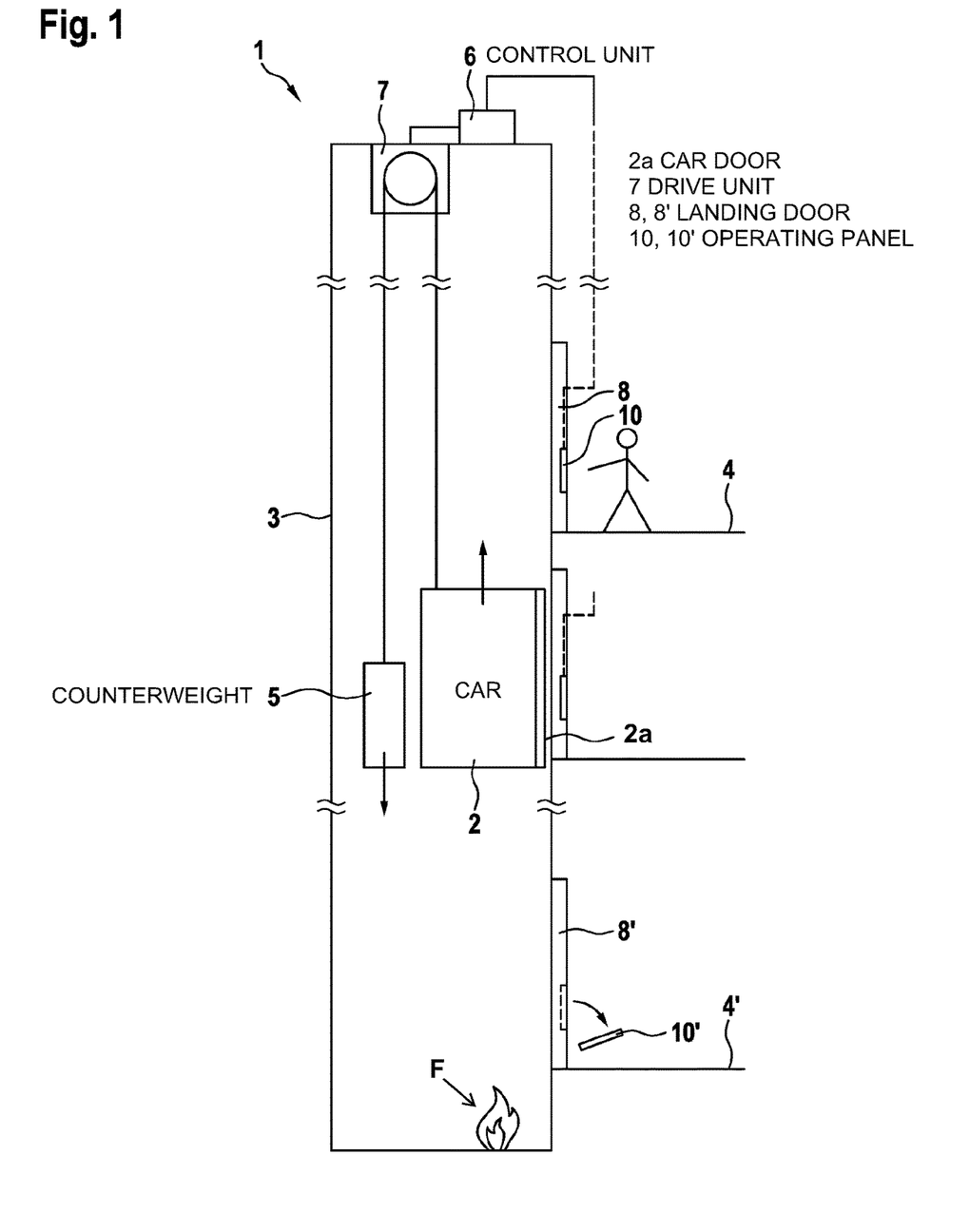
FIG. 1 is a simplified representation of an elevator system in a side view.

FIG. 1 shows an elevator system, denoted by 1, for a multi-story building. The building has one elevator shaft 3 or a plurality of elevator shafts as required. The elevator system 1, shown here by way of example, contains an elevator car 2 that can be moved vertically up and down in the elevator shaft 3 for transporting people or goods to individual floors. The elevator car 2 has a car door 2a. A landing door 8 is associated with each floor 4. The elevator system 1 has a counterweight 5 connected to the elevator car 2 via suspension means (e.g. belts or steel cables). In order to move the elevator car 2 and the counterweight 5, a drive unit 7 is provided that is controlled by an elevator control unit 6. The drive unit 6 (e.g. a traction drive) drives the one or more suspension means and thus moves the car 2 and the counterweight 5 in opposite directions.

The landing door 8 is designed as a floor door of the elevator system 1, closes the elevator shaft 3 and forms the access from the floor 4 to the elevator shaft 3. If the person who is located on floor 4 wishes to use the elevator, he/she operates an operating panel denoted by 10, for example by pressing a button. The button may be a ductile button. However, the button may also be provided by a touchscreen surface.

In the present case, the operating panel 10 is designed as a call detection unit for inputting a floor call. After the floor call, the elevator car 2 moves to the floor at which the person made the floor call. In order to inform the person waiting on the elevator car 2, the operating panel 10 can have a floor display, which is why the part 10 can also be referred to below as "operating and display panel." The floor display serves to display information about the position of the elevator car, such as the floor on which the elevator car is currently located. Instead of or in addition to this generally numeric display, the operating and display panel 10 can comprise a directional display. The directional display indicates the direction in which the elevator car is currently moving. The operating and display panel 10 could also indicate that an arrival of an elevator car is imminent, whether an elevator car is currently waiting behind the landing door, whether the elevator car is empty or already fully occupied, where the elevator car will go next, etc. The mentioned displays could also be performed via a display panel 10, which is separate from an operating panel 10 and likewise integrated in the door leaf 9 (see FIG. 2).

The landing doors 8 are equipped with ejection devices (not shown here) which are described in detail below and by means of which the operating and/or display panel 10 can be completely or partially removed from the door leaf 9 in the event of a fire. In FIG. 1, a fire event F is indicated. Due to the temperatures occurring during the fire, the ejection device of the landing door 8' on floor 4' is activated, whereupon the operating and/or display panel denoted by 10' is separated from the door leaf of the landing door 8' and falls to the floor.

Figure 2:
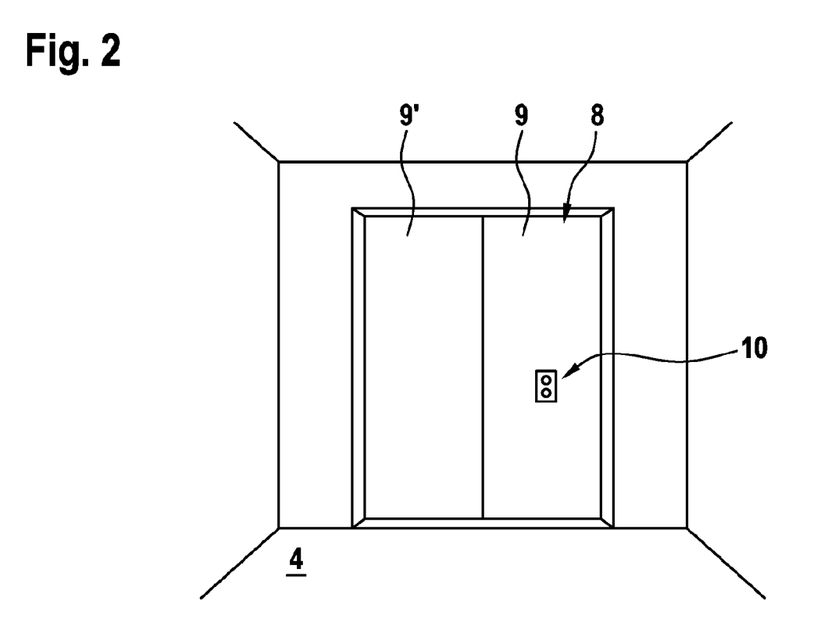
FIG. 2 is a simplified perspective view of a landing door with a door leaf with an integrated operating and/or display panel.

FIG. 2 shows the landing door 8 from the front from a floor 4. The landing door 8 has two door leaves that can be moved in opposite directions in order to be moved between an open and a closed position. The door leaf, which is denoted by 9 and is located on the right in FIG. 2 of the present exemplary embodiment, is equipped with an operating and/or display panel 10. Of course, the left-hand door leaf denoted by 9' could alternatively be equipped with an operating and/or display panel 10. It would even be conceivable to equip both door leaves 9, 9' with operating and/or display panels 10. The door leaf 9 is equipped with the already mentioned ejection device (not shown here), by means of which the operating and/or display panel 10 can be completely or partially removed from the door leaf 9 in the event of a fire.

Figure 3:
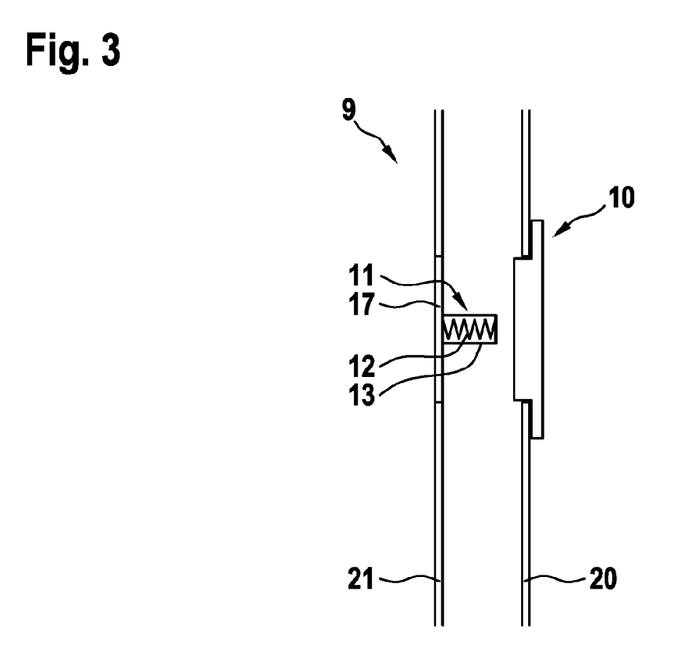
FIG. 3 is a schematic representation of a door leaf with an integrated operating and/or display panel in a side view.
Figure 4:
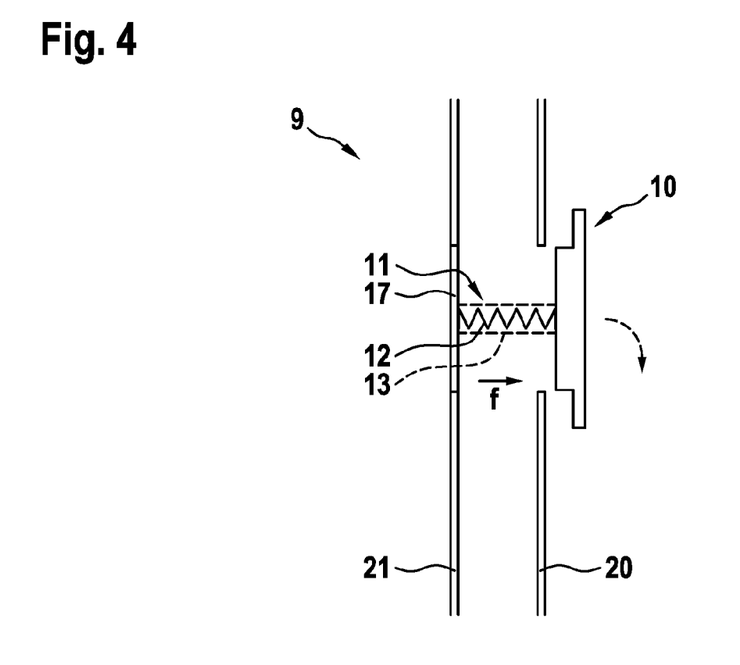
FIG. 4 shows the door leaf of FIG. 3 with the operating and/or display panel removed during a fire event.

FIG. 3 shows a door leaf 9 with an operating and/or display panel 10 integrated therein. The door leaf 9 has an outer wall 20 and a rear wall 21 running parallel and at a distance therefrom. Furthermore, a support structure (not shown) can be provided between the outer wall 20 and the rear wall 21, which support structure connects the two walls to one another and ensures sufficient rigidity of the door leaf 9. The operating and/or display panel 10 is fixed to the outer wall 20. Fixing can be effected, for example, by an adhesive connection. The ejection device 11 comprises an actuator with a preloaded spring 12. The spring 12 is held in an actuator housing 13 which consists of a plastic material and holds the spring 12 in the preloaded rest position. This position corresponds to the normal state of the elevator system. In the event of a fire, the actuator housing 13 melts, releasing the spring 12. The spring 12 now presses the operating and/or display panel 10 into the direction denoted by arrow f, until the operating and/or display panel 10 comes off. FIG. 4 shows the door leaf 9 in the event of a fire after activation of the ejection device 11. Thereupon, the operating and/or display panel 10 is can be removed from the door leaf 9.

As a result of a corresponding selection of the adhesive or a point application of the adhesive, the aforementioned adhesive connection is advantageously so weak that the spring force can detach the operating and/or display panel 10 from the outer wall 20. However, detachable connections instead of the adhesive connection are also conceivable. For example, mechanical fixings using screws or the like are also conceivable. The mechanical fixing of the operating and/or display panel 10 to the outer wall 20 can have a predetermined breaking point or predetermined breaking element which, when acted upon by the spring 12, breaks or otherwise yields and thus enables the operating and/or display panel 10 to be removed in the event of a fire.

Instead of the actuator with the preloaded spring 12 according to FIG. 3, the ejection device 11 could also comprise a body (not shown here) of intumescent material, which body, in the event of a fire, pushes off the operating and/or display panel 10 outward as a result of the volume increase of the intumescent material under the effect of heat.

Figure 5:
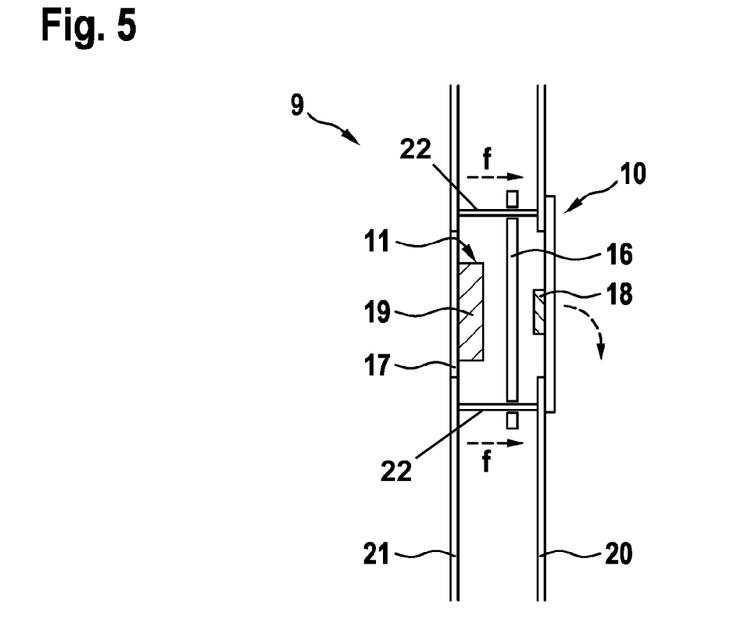
FIG. 5 is a schematic representation of a door leaf with integrated operating and/or display panel according to a further exemplary embodiment a side view.

A variant of an ejection device 11 based on intumescent material is shown in FIG. 5. The body of intumescent material 19 is attached to the inside of the rear wall 21. An ejection plate 16 is arranged in the door leaf 9 between the intumescent material 19 and the operating and/or display panel 10. The ejection plate 16 is movably mounted on guide rods 22. If the intumescent material 19 foams up in the event of a fire, the ejection plate 16 is moved against the operating and/or display panel 10 in the direction indicated by arrows f. The ejection plate 16 then pushes the operating and/or display panel 10 out of the fixing of the outer wall 20. The ejection plate 16 pushes against the inside of the outer wall 20 and closes the gap in the outer wall 20 that results from the removal of the operating and/or display panel 10. Due to the intumescent material 19, an advantageous ejection device 11 which can be automatically activated under the effect of heat can be created for removing the operating and/or display panel 10 containing easily flammable or combustible parts, which has a positive effect on the fire safety of the elevator system 1.

In order to optimize the ejection process, intumescent material 18 is attached on the inside surface of the operating and/or display panel 10 and additionally supports the ejection of the operating and/or display panel 10. However, this intumescent material 18 can also be omitted, in particular if, for reliable separation, the inside surface of the operating and/or display panel 10 has, for example, elevations or projections provided by electronic components or, where applicable, by additional spacers.

The arrangement shown in FIG. 5 with the ejection plate 16 could also be advantageous with other actuators. For example, the intumescent material 19 can be replaced by an actuator that can be activated under the effect of heat and has a preloaded spring or, where applicable, also by an actuator that expands in heat and has a memory metal or a bi-metal.

FIGS. 6 to 9 relate to a further exemplary embodiment of a door leaf 9 of a landing door 8, wherein the door leaf 9 has an operating and/or display panel 10 integrated in the door leaf 9, and wherein the door leaf 9 has an ejection device 11 based on intumescent material, for at least partially removing the operating and/or display panel 10 from the door leaf 9. The operating and/or display panel 10 contains a printed circuit board 14 with the electronic components for operating the operating and/or display panel, and a carrier frame 15 for carrying the printed circuit board 14. A touchscreen surface 25 can be arranged on the printed circuit board 14. However, other operating and display elements can also be provided if required.

Figure 7:
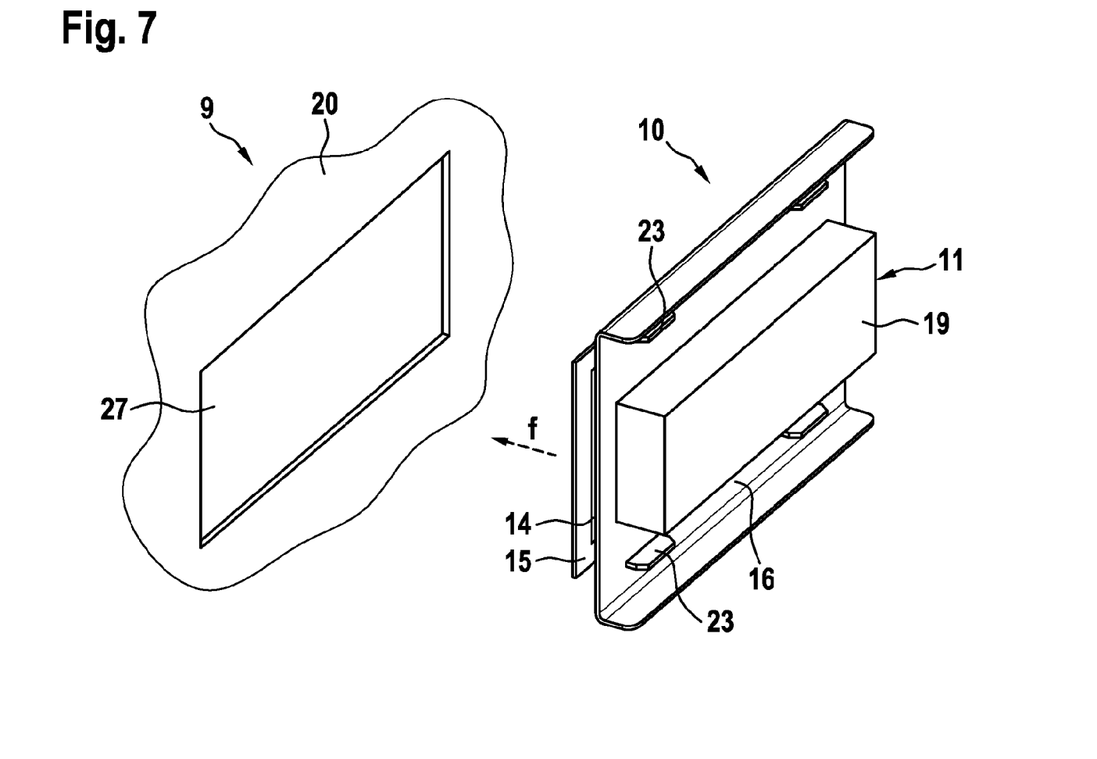
FIG. 7 shows a door leaf and an operating and/or display panel in a rear view before assembly.
Figure 8:
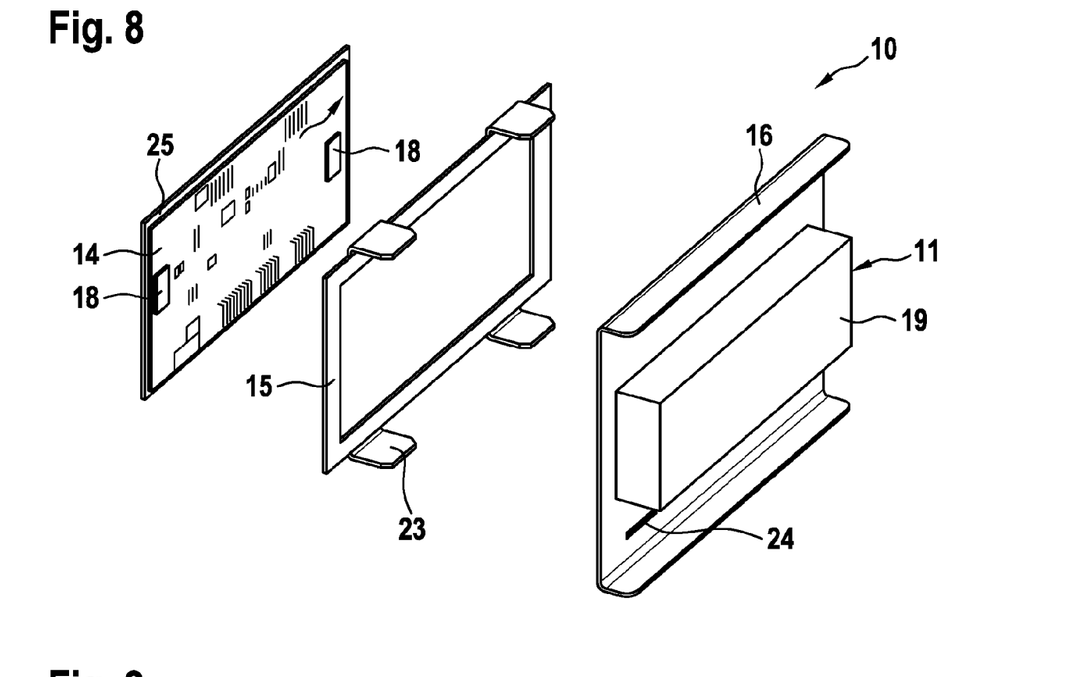
FIG. 8 shows the operating and/or display panel in an exploded view.
Figure 9:
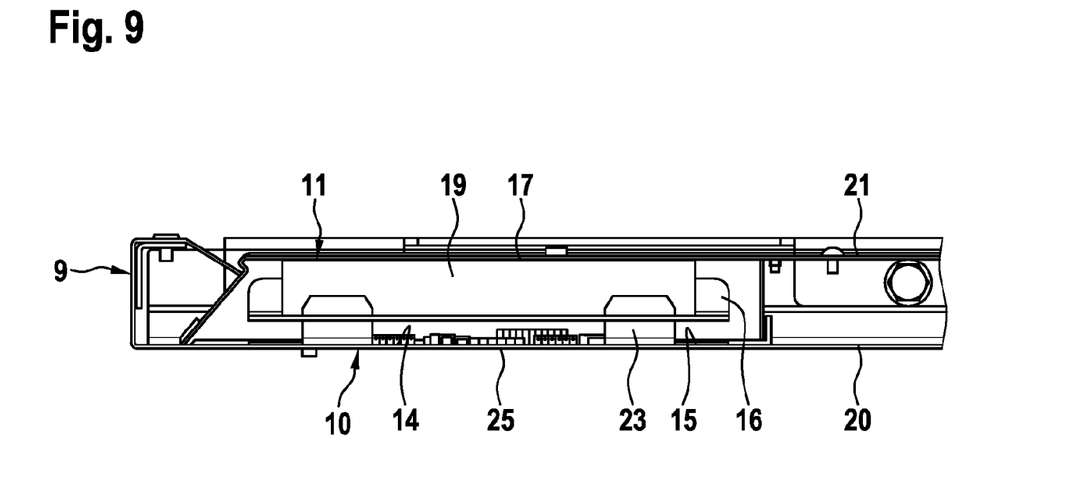
FIG. 9 is a side view of the door leaf with an integrated operating and/or display panel.

The printed circuit board 14 with the touchscreen surface 25 can be glued on the carrier frame 15. FIG. 8 shows, for example, that intumescent material 18 is arranged on the printed circuit board 14. The intumescent material 18 can form a spacer so that the printed circuit board 14 is spaced apart from the internal metallic door leaf parts 17 that become hot in the event of a fire. As the other FIGS. 6, 7, and 9 show, the intumescent material 18 arranged on the printed circuit board 14 can also be omitted.

Figure 6:
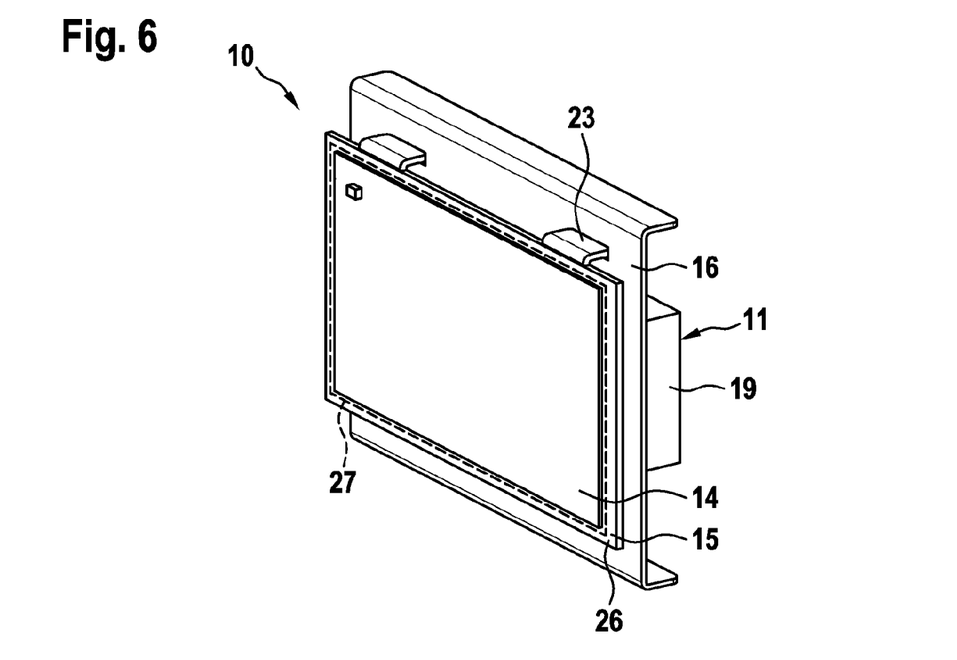
FIG. 6 is a perspective representation of an operating and/or display panel for installation in a door leaf.

A rectangular cutout 27 which is associated with the outer wall 20 and into which the operating and/or display panel 10 is inserted is indicated by dashed lines in FIG. 6. After insertion from the inside, the operating and/or display panel 10 is fixed to the outer wall 20 using adhesive. A corresponding frame-shaped adhesive region on the carrier frame 15 is denoted by 26. The cutout 27 in the outer wall 20 can again be seen in FIG. 7.

Furthermore, an ejection plate 16 that can be moved in the direction of the printed circuit board 14 is arranged in the door leaf 9. For guiding the ejection plate 16, guide elements in the form of guide tongues 23 created by bending are formed onto the carrier frame 15. The ejection plate 16 has four slots 24 into which the guide tongues 23 are received. The ejection plate 16 can thus be guided in a simple manner along the guide tongues 23 in the horizontal direction.

Intumescent material 19 in the form of a comparatively thick plate is attached to the ejection plate 16. The rear wall 21 is closed in the region of the operating and/or display panel 10 by a cover part 17 detachably fastened to the rear wall. The cover part 17 forms a fixed stop on which the intumescent material 19 can be supported in the event of a fire.

Like the outer wall 20, the rear wall 21 and the support structure, the ejection plate 16 is made of a metal and is thus comparatively fire-resistant. The ejection plate 16 is designed and integrated in the door leaf 9 in such a way that, after removing the printed circuit board 14, it closes the carrier frame 15 or the interior thereof.

In the event of a fire, the following can, for example, happen: When a fire breaks out in the building, smoke and hot gases can pass from the fire via the elevator shaft 3 to the landing door 8. If a particular temperature is exceeded, the intumescent material 19 is activated. The now activated intumescent material 19 increases its volume so that the ejection plate 16 is displaced against the printed circuit board 14. As a result of the effect of heat, the intumescent material 18 arranged on the printed circuit board 14 can likewise increase its volume, resulting in an additional movement of the printed circuit board 14 outward. The printed circuit board 14 can thus be efficiently pushed outward until it comes off of the door leaf 9. However, cases during a fire are also conceivable in which the intumescent material 18 is activated first and the intumescent material 19 is activated only thereafter. The ejection device 11 shown here with the two intumescent materials 18 and 19 thus generates a two-stage ejection process. The ejection plate 16 is displaced further toward the outer wall 20 and closes the carrier frame 15. The gap resulting from the removal of the printed circuit board 14 in the cutout 27 in the door leaf 9 is now closed again.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system comprising:
   a door leaf;
   an operating and/or display panel mounted in the door leaf, the operating and/or display panel adapted to at least one of input a control command to the elevator system and display information about the elevator system; and
   an ejection device positioned in the door leaf, wherein the ejection device, when activated by heat from a fire, at least partially removes the operating and/or display panel from the door leaf.

2. The elevator system according to claim 1 wherein the ejection device includes an actuator that expands in response to the heat, the actuator including a memory metal, a bi-metal or a preloaded spring that expands to at least partially remove the operating and/or display panel from the door leaf.

3. The elevator system according to claim 1 wherein the ejection device includes an intumescent material that is activated by the heat to at least partially remove the operating and/or display panel from the door leaf.

4. The elevator system according to claim 1 wherein the operating and/or display panel includes a printed circuit board carried by a carrier frame, the printed circuit board being removed from the carrier frame and the door leaf by the activation of the ejection device.

5. The elevator system according to claim 4 wherein the ejection device includes an intumescent material attached to the printed circuit board.

6. The elevator system according to claim 1 including an ejection plate being movable in the door leaf in a direction of the operating and/or display panel, the ejection plate being moved by the activated ejection device to at least partially remove the operating and/or display panel from the door leaf.

7. The elevator system according to claim 6 wherein activated ejection device moves the ejection plate to close a gap in the door leaf that results when the operating and/or display panel is at least partially removed from the door leaf.

8. The elevator system according to claim 6 wherein the operating and/or display panel includes a printed circuit board and the ejection plate is moved to remove the printed circuit board from the door leaf.

9. The elevator system according to claim 8 wherein the activated ejection device moves the ejection plate to close a gap in the door leaf that results when the printed circuit board is removed from the door leaf.

10. The elevator system according to claim 6 including guide means arranged in the door leaf and guiding movement of the ejection plate to the gap.

11. The elevator system according to claim 10 wherein the guide means are guide rods upon which the ejection plate is movably mounted.

12. The elevator system according to claim 10 wherein the operating and/or display panel includes a carrier frame carrying a printed circuit board and wherein the guide means include guide elements formed on the carrier frame, each of the guide elements being received in an associated slot formed in the ejection plate enabling movement of the ejection plate along the guide elements.

13. The elevator system according to claim 6 wherein the ejection device includes intumescent material attached to the ejection plate.

14. The elevator system according to claim 13 wherein the door leaf has a rear wall that forms a fixed stop on which the intumescent material attached to the ejection plate is supported when the intumescent material is activated by the heat.

15. An operating and/or display panel for an elevator system, the panel comprising:
    a printed circuit board;
    a carrier frame carrying the printed circuit board; and
    an intumescent material that moves the printed circuit board relative to the carrier frame and/or moves the printed circuit board and the carrier frame relative to a component of the elevator system when the intumescent material is activated by heat from a fire.

16. A fire-proof flat elevator component comprising:
    an operating and/or display panel mounted in the elevator component, the operating and/or display panel adapted to at least one of input a control command to an elevator system and display information about the elevator system; and
    an ejection device positioned in the elevator component, wherein the ejection device, when activated by heat from a fire, at least partially removes the operating and/or display panel from the elevator component.

* * * * *